(12) United States Patent
Park et al.

(10) Patent No.: US 11,228,675 B2
(45) Date of Patent: Jan. 18, 2022

(54) METHOD FOR DERIVING FREQUENTLY USED APPLICATION, AND APPARATUS USING THE SAME

(71) Applicant: LG ELECTRONICS INC., Seoul (KR)

(72) Inventors: Sung Hyun Park, Seoul (KR); Mun Ho Yun, Incheon (KR); Soo Jin Lee, Seoul (KR); Yong Suk Lee, Gimpo-si (KR); Il Hwan Choi, Suwon-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/640,335

(22) PCT Filed: Apr. 12, 2019

(86) PCT No.: PCT/KR2019/004469
§ 371 (c)(1),
(2) Date: Feb. 19, 2020

(87) PCT Pub. No.: WO2019/147110
PCT Pub. Date: Aug. 1, 2019

(65) Prior Publication Data
US 2021/0073008 A1 Mar. 11, 2021

Related U.S. Application Data

(60) Provisional application No. 62/808,245, filed on Feb. 20, 2019.

(51) Int. Cl.
H04M 1/72472 (2021.01)
G06F 9/451 (2018.01)
(Continued)

(52) U.S. Cl.
CPC ...... H04M 1/72472 (2021.01); G06F 3/0482 (2013.01); G06F 3/04817 (2013.01);
(Continued)

(58) Field of Classification Search
CPC ......... H04M 1/72472; H04M 1/72451; H04M 1/72454; G06F 3/04817; G06F 3/0482; G06F 9/451
See application file for complete search history.

(56) References Cited

U.S. PATENT DOCUMENTS 8,490,006 B1 * 7/2013 Reeser .................. G05B 15/02
715/771
10,013,095 B1 * 7/2018 Smith .................... G06F 3/013
(Continued)

FOREIGN PATENT DOCUMENTS

JP 2007-193700 A 8/2007
KR 10-2012-0122051 A 11/2012
(Continued)

OTHER PUBLICATIONS

Will Knight, The Dark Secret at the Heart of AI, 120 MIT Technology Review 54-63 (May 18, 2017) (retrieved from <https://dialog.proquest.com/professional/docview/1899732527?accountid=131444> (Year: 2017).*
(Continued)

Primary Examiner — Justin R. Blaufeld
(74) Attorney, Agent, or Firm — Birch, Stewart, Kolasch & Birch, LLP

(57) ABSTRACT

The present disclosure provides a method of displaying frequently used applications and an apparatus using the same. The method of displaying frequently used applications includes: collecting application usage information in at least any one of a time period of a day or a user activity; determining an application usage pattern based on the col-
(Continued)

lected application usage information; and determining frequently used applications in the time period of a day or the user activity based on the determined application usage pattern, and displaying the determined frequently used applications.

19 Claims, 12 Drawing Sheets

(51) Int. Cl.
*H04M 1/72451* (2021.01)
*G06F 3/0481* (2013.01)
*G06F 3/0482* (2013.01)
*H04M 1/72454* (2021.01)

(52) U.S. Cl.
CPC ........ *G06F 9/451* (2018.02); *H04M 1/72451* (2021.01); *H04M 1/72454* (2021.01)

(56) References Cited

U.S. PATENT DOCUMENTS

| | | | | |
|---|---|---|---|---|
| 10,470,015 | B1* | 11/2019 | Alam | H04W 4/60 |
| 2004/0243257 | A1* | 12/2004 | Theimer | H04M 1/72454 |
| | | | | 700/44 |
| 2004/0260801 | A1* | 12/2004 | Li | H04L 63/0227 |
| | | | | 709/223 |
| 2005/0138564 | A1* | 6/2005 | Fogg | G06F 3/04817 |
| | | | | 715/745 |
| 2012/0276953 | A1* | 11/2012 | Kim | G06F 9/44505 |
| | | | | 455/556.1 |
| 2013/0024815 | A1* | 1/2013 | O | G06F 3/0482 |
| | | | | 715/811 |
| 2013/0311946 | A1* | 11/2013 | Kwon | G06F 3/0482 |
| | | | | 715/811 |
| 2014/0201675 | A1* | 7/2014 | Joo | H04W 4/80 |
| | | | | 715/784 |
| 2014/0282207 | A1* | 9/2014 | Wouhaybi | G06F 3/0482 |
| | | | | 715/779 |
| 2015/0160797 | A1* | 6/2015 | Shearer | H04L 12/2816 |
| | | | | 715/740 |
| 2015/0347488 | A1* | 12/2015 | Peters | G06F 3/04842 |
| | | | | 715/765 |
| 2016/0062635 | A1 | 3/2016 | Feit et al. | |
| 2016/0091871 | A1* | 3/2016 | Marti | H04L 12/2803 |
| | | | | 702/188 |
| 2016/0165038 | A1* | 6/2016 | Lim | G06Q 10/109 |
| | | | | 715/728 |
| 2017/0160881 | A1* | 6/2017 | Kanemoto | H04M 1/72403 |
| 2017/0357329 | A1* | 12/2017 | Park | G06F 1/325 |
| 2018/0253652 | A1* | 9/2018 | Palzer | H04M 1/72472 |
| 2020/0076898 | A1* | 3/2020 | Shukla | H04L 29/08972 |

FOREIGN PATENT DOCUMENTS

| | | |
|---|---|---|
| KR | 10-1233955 B1 | 2/2013 |
| KR | 10-1579585 B1 | 12/2015 |
| KR | 10-2017-0138667 A | 12/2017 |
| KR | 10-2019-0007513 A | 1/2019 |

OTHER PUBLICATIONS

Marc Claesen and Bart De Moor, Hyperparameter Search in Machine Learning, MIC 2015: The XI Metaheuristics International Conference (Apr. 6, 2015) <https://arxiv.org/abs/1502.02127>. (Year: 2015).*

Gil Press, Cleaning Big Data: Most Time-Consuming, Least Enjoyable Data Science Task, Survey Says, Forbes Online (Mar. 23, 2016) < https://www.forbes.com/sites/gilpress/2016/03/23/data-preparation-most-time-consuming-least-enjoyable-data-science-task-survey-says/?sh=1a081d3b6f63> (Year: 2016).*

Dhruv Sharma, Problems in Machine Learning Models? Check your Data First, Towards Data Science blog (Aug. 30, 2019), < https://towardsdatascience.com/problems-in-machine-learning-models-check-your-data-first-f6c2c88c5ec2> (Year: 2019).*

Will Knight, The Dark Secret at the Heart of AI, 120 MIT Technology Review 54-63 (May 18, 2017) <https://dialog.proquest.com/professional/docview/1899732527> (Year: 2017).*

Chu et al., "I Am a Smartphone and I Know My User is Driving," 2014 Sixth International Conference on Communication Systems and Networks (COMSNETS), IEEE, Jan. 6, 2014, pp. 1-8, XP032564095.

* cited by examiner

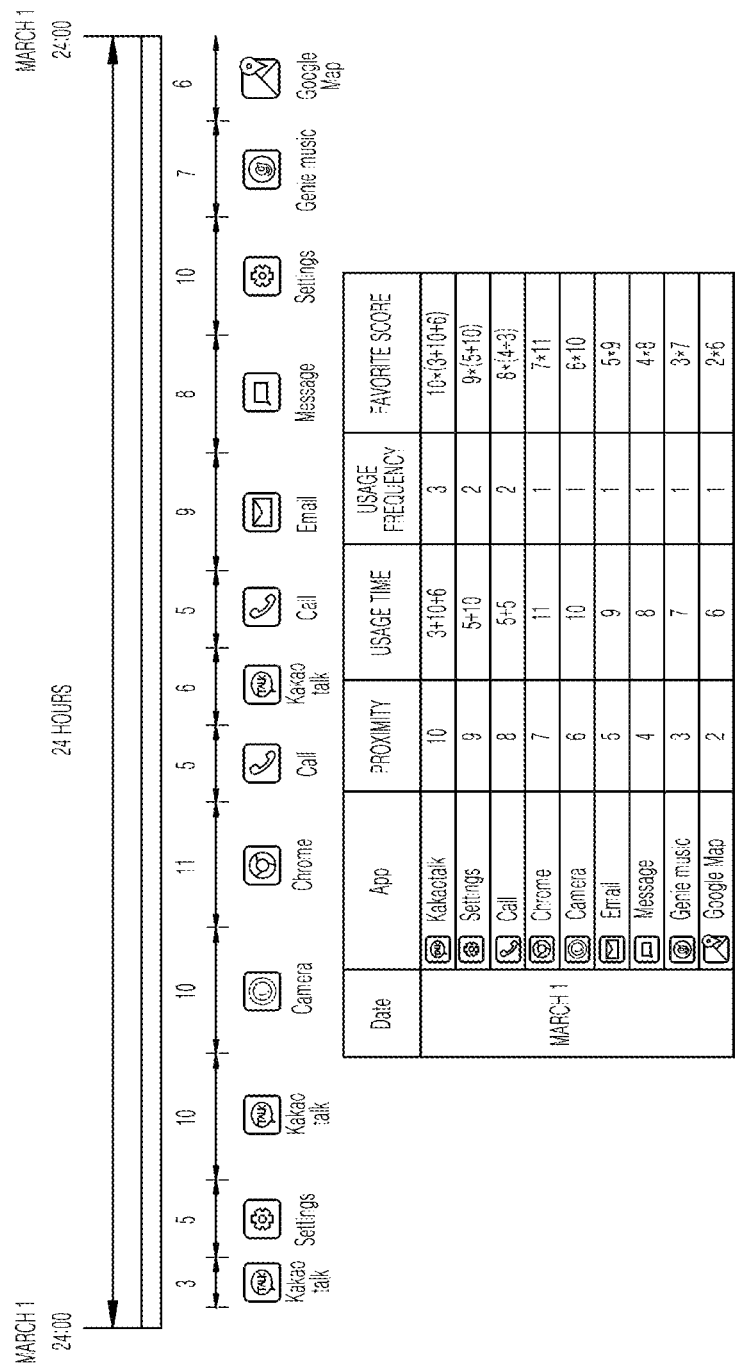

FIG. 12

| Date | App | PROXIMITY | USAGE TIME | USAGE FREQUENCY | FAVORITE SCORE |
|---|---|---|---|---|---|
| MARCH 1 | Kakaotalk | 10 | 19 | 3 | 190 |
| | Settings | 9 | 15 | 2 | 135 |
| | Instagram | 8 | 10 | 2 | 80 |
| | Chrome | 7 | 11 | 1 | 77 |
| | Camera | 6 | 10 | 1 | 60 |
| | Email | 5 | 9 | 1 | 45 |
| | Message | 4 | 8 | 1 | 32 |

| Date | App | PROXIMITY | USAGE TIME | USAGE FREQUENCY | FAVORITE SCORE |
|---|---|---|---|---|---|
| MARCH 3 | Kakaotalk | 10 | 35 | 10 | 350 |
| | Message | 9 | 20 | 4 | 180 |
| | Genie music | 8 | 18 | 4 | 144 |
| | Chrome | 7 | 22 | 3 | 154 |
| | Settings | 6 | 20 | 3 | 120 |
| | Email | 5 | 14 | 2 | 70 |
| | Google Map | 4 | 12 | 2 | 48 |

INTEGRATION

| Date | App | PROXIMITY | USAGE TIME | USAGE FREQUENCY | FAVORITE SCORE |
|---|---|---|---|---|---|
| MARCH 2 | Settings | 10 | 24 | 5 | 240 |
| | Chrome | 9 | 20 | 4 | 180 |
| | Kakaotalk | 8 | 16 | 4 | 128 |
| | Google Map | 7 | 11 | 3 | 77 |
| | Genie music | 6 | 15 | 2 | 90 |
| | Instagram | 5 | 9 | 2 | 45 |

| Date | App | PROXIMITY | USAGE TIME | USAGE FREQUENCY | FAVORITE SCORE |
|---|---|---|---|---|---|
| MARCH 4 | Instagram | 10 | 16 | 7 | 160 |
| | Kakaotalk | 9 | 22 | 5 | 198 |
| | Genie music | 8 | 24 | 4 | 192 |
| | Settings | 7 | 12 | 4 | 84 |
| | Chrome | 6 | 10 | 4 | 80 |
| | Message | 5 | 14 | 2 | 70 |
| | Camera | 4 | 12 | 1 | 48 |

FIG.13

| Date | App | PROXIMITY | USAGE TIME | USAGE FREQUENCY | FAVORITE SCORE |
|---|---|---|---|---|---|
| MARCH 5 | Kakaotalk | 37 | 92 | 22 | 866 |
| | Settings | 32 | 71 | 14 | 579 |
| | Chrome | 29 | 63 | 12 | 471 |
| | Instagram | 23 | 35 | 11 | 285 |
| | Genie music | 22 | 57 | 10 | 426 |
| | Camera | 14 | 28 | 3 | 132 |
| | Game | 13 | 28 | 5 | 212 |
| | Text | 10 | 23 | 3 | 115 |

| Date | 1ST FREQUENTLY USED APP (PROXIMITY) | 2ND, 3RD, 4TH FREQUENTLY USED APP (FAVORITE SCORE) | | | 5TH FREQUENTLY USED APP (USAGE TIME) |
|---|---|---|---|---|---|
| MARCH 5 | Kakaotalk | Settings | Chrome | Genie music | Instagram |

4:55

SMART BULLETIN BOARD

N — FREQUENTLY USED APPS

KAKAO TALK | SETTINGS | CHROME | GENIE MUSIC | Instagram

METHOD FOR DERIVING FREQUENTLY USED APPLICATION, AND APPARATUS USING THE SAME

CROSS REFERENCE TO RELATED APPLICATIONS

This application is the National Phase of PCT International Application No. PCT/KR2019/004469, filed on Apr. 12, 2019, which claims priority under 35 U.S.C. 119(e) to U.S. Provisional Application No. 62/808,245, filed on Feb. 20, 2019, all of which are hereby expressly incorporated by reference into the present application.

BACKGROUND

1. Technical Field

The present disclosure relates to a method of expressing frequently used applications and an apparatus using the same. More specifically, the present disclosure relates to a method of expressing frequently used applications by learning which applications are used in different time periods and situations, and recommending frequently used applications depending on the time period and situation, and an apparatus using the same.

2. Description of the Related Art

The term "app" is an abbreviation for a smartphone application. Hundreds of new apps are released every day, and the number of apps is rapidly increasing.

The number of apps registered on the representative app trading sites such as Google Play and Apple's App Store is more than 2.6 million. This shows that the types of apps are diverse and the number of apps is increasing.

Since a large number of diverse apps are installed on a smartphone, a smartphone user is required to search for and then execute a desired app. Therefore, the time and effort required for the user to execute the desired app increases, which makes it difficult for a user to effectively execute a frequently used app.

Accordingly, smartphone manufacturers, communication carriers, and the like provide convenience to smartphone users by allowing them to use a folder where apps are stored based on the frequency of use, alphabetical order, type of service, and the like. Since, however, the number of apps installed on a smartphone is increasing, the problems associated with the inconvenience of searching for and executing a desired app remain.

As a patent document related to the present disclosure, Korean Laid-open Patent Publication No. 10-2019-0007513, entitled "App recommendation system and user terminal and method using the same" comprises learning when to recommend an app and outputting at least one execution candidate app through a user interface.

The app recommendation system disclosed in Korean Laid-open Patent Publication No. 10-2019-0007513 estimates a plurality of situations of a user terminal, in a state where the user terminal is connected to an app recommendation service server through a communication network, determines execution candidate apps corresponding to the respective situations, and learns when to recommend the execution candidate app. Thereafter, the probability that the user terminal is in a specific situation is estimated, and an execution candidate app that has been determined to correspond to the estimated specific situation can be detected and presented. In such a case, since a specified number of situations for a specified period of time are estimated using probability, factors such as the number of times of execution of the app, the usage time of the app, and the like are not considered. Therefore, inconvenience is caused in searching for and executing a user's desired app.

In addition, Korean Patent No. 10-1579585, entitled "Method, apparatus, and system for monitoring user's behavior, and recording medium for executing the same" discloses that services can be provided based on user behavior information. Specifically, a biological signal, movement information, or the like is monitored, and an app suitable for a monitored user's situation mode is executed.

In Korean Patent No. 10-1579585, the user's behavior is first monitored, and then a situation mode is set based on the monitored user's behavior. Thereafter, user behavior information is collected and analyzed so as to execute an app suitable for a preset situation mode, such as a drowsiness detection service, an exercise amount measurement service, and the like.

Further, in Korean Patent No. 10-1579585, information on the frequency of use of app, the usage time, or the like is not considered. Therefore, the problems in expressing the user's frequently used app are still not solved, and services allowing a user to execute a frequently used app without first searching for the app are required.

PRIOR ART

Patent Documents

Korean Laid-open Patent Publication No. 10-2019-0007513 (published on Jan. 22, 2019)
Korean Patent No. 10-1579585 (issued on Dec. 16, 2015)

SUMMARY OF THE DISCLOSURE

The present disclosure is directed to improving the accessibility of apps and the convenience of an app user by expressing frequently used apps in response to a user's situation, in order to save time and effort otherwise spent searching for and executing each frequently used app.

The present disclosure is further directed to improving the accuracy of extracting a user's frequently used apps by extracting the frequently used apps according to a plurality of conditions.

The present disclosure is still further directed to allowing the user to easily select an app by simplifying the display of the apps on a user terminal, by extracting the frequently used apps such that frequently used apps in a daily time period do not overlap with frequently used apps in a specific time period and a specific situation.

The present disclosure is still further directed to minimizing time and effort in using an app in a daily time period, by preventing the apps frequently used in a specific time period and a specific situation from being displayed on the user terminal in the daily time period.

In order to achieve the above-described objects, a method of expressing frequently used apps according to an embodiment of the present disclosure can include: collecting usage information of apps executed in a user terminal; learning an app usage pattern using an artificial intelligence algorithm based on the collected app usage information; and extracting frequently used apps based on the learned app usage pattern and recommending the extracted apps as frequently used apps.

In order to achieve the above-described objects, when the frequently used apps are extracted and recommended by the method of expressing frequently used apps according to the embodiment of the present disclosure, the app usage information in at least one of a daily time period, a pre-bedtime period, and a driving situation can be collected.

Further, in order to achieve the above-described objects, the frequently used apps in the daily time period and the pre-bedtime period can be extracted based on an app usage frequency, and the frequently used apps in the driving situation can be extracted based on an application execution order.

In other words, the frequently used apps can be extracted and recommended according to various conditions, not one condition.

Accordingly, it is possible to avoid biased extraction and recommendation of the frequently used apps, and to extract the frequently used apps according to more objective conditions.

In the method of expressing frequently used apps according to the embodiment of the present disclosure, the frequently used apps in the daily time period and the frequently used apps in the pre-bedtime period can be extracted based on a frequency proximity obtained by quantifying the app usage frequency. At this time, the app having the maximum frequency proximity can be extracted as a first frequently used app in the daily time period and the pre-bedtime period. In other words, in extracting the app most preferred in the daily time period and the pre-bedtime period, the most frequently used app can be extracted as the first frequently used app in the daily time period and the pre-bedtime period.

Further, in the method of expressing frequently used apps according to the embodiment of the present disclosure, when the frequently used apps in the driving situation are extracted, the app having a maximum order proximity can be extracted, based on an order proximity obtained by quantifying the app execution order, as a first frequently used app in the driving situation. In other words, in the driving situation, the app which is executed first can be extracted as the most preferred app.

As described above, by extracting the most preferred app according to different conditions depending on the specific time period and the specific situation, the frequently used apps can be extracted according to more objective conditions.

In the method of expressing frequently used apps according to the embodiment of the present disclosure, when the frequently used apps in the daily time period and the frequently used apps in the pre-bedtime period are extracted, the first frequently used app in the daily time period and the pre-bedtime period is extracted; a second frequently used app in the daily time period and the pre-bedtime period is extracted based on a favorite score determined by both the app frequency proximity and the app usage time; and a third frequently used app is extracted based on the usage time proximity determined only by the app usage time.

Further, in the method of expressing frequently used apps according to the embodiment of the present disclosure, when the frequently used apps in the driving situation are extracted, the first frequently used app in the driving situation is extracted; a second frequently used app in the driving situation is extracted based on a favorite score determined by both the app order proximity and the app usage time; and a third frequently used app is extracted based on the usage time proximity determined only by the app usage time.

In such a manner, by extracting the most preferred app and a preferred sequence of apps according to different conditions, it is possible to avoid biased extraction of the apps.

In the method of expressing frequently used apps according to the embodiment of the present disclosure, the time when the app was last executed in the user terminal is determined, and it is then determined whether at least four hours have elapsed from the time when the app was last executed to the time when the app is executed again in the user terminal. If it is determined that at least four hours have elapsed, the time period from the time when the app was last executed to a predetermined time can be determined as the pre-bedtime period.

Further, in the method of expressing frequently used apps according to the embodiment of the present disclosure, it is possible to recommend frequently used apps in the pre-bedtime period which are different from the frequently used apps in the daily time period.

In the method of expressing frequently used apps according to the embodiment of the present disclosure, it is determined whether the user terminal is connected to a system of a vehicle, and from the time when the user terminal is connected to the system of the vehicle it can be determined that the user terminal is being used in the driving situation.

Further, in the method of expressing frequently used apps according to the embodiment of the present disclosure, it is possible to recommend frequently used apps such that the frequently used apps in the driving situation do not overlap with the frequently used apps in the daily time period.

In other words, by simultaneously displaying the frequently used apps in the driving situation and the frequently used apps in the daily time period, the convenience of the user in using the apps can be improved by allowing the user to recognize for which situation the frequently used apps are recommended.

In the method of expressing frequently used apps according to the embodiment of the present disclosure, after it is determined that the user terminal is being used in the driving situation, it can be determined that the driving situation has been terminated when a motion sensor of the user terminal senses that the user is walking, or when a connection signal between the user terminal and the system of the vehicle weakens to a predetermined level or less.

When it is determined that the connection between the user terminal and the system of the vehicle has been disconnected, extraction of the frequently used apps in the driving situation is stopped, and only the frequently used apps in the daily time period can be extracted. Therefore, when the time period and the situation change, by displaying only the frequently used apps in the daily time period, it is possible to display the frequently used apps suitable for the time period and the situation.

In order to achieve the above-described objects, an apparatus for expressing frequently used apps according to an embodiment of the present disclosure can include: a memory configured to collect app usage information in at least one of a daily time period, a pre-bedtime period, and a driving situation; and a processor configured to learn an app usage pattern using an artificial intelligence algorithm based on the collected app usage information, and extract and recommend frequently used apps in the daily time period, the pre-bedtime period, and the driving situation, based on the learned app usage pattern.

Further, in order to achieve the above-described objects, in the apparatus for expressing frequently used apps according to the embodiment of the present disclosure, the processor can extract and recommend the frequently used apps in the daily time period and the pre-bedtime period based on the app usage frequency.

Further, in order to achieve the above-described objects, the processor of the apparatus for expressing frequently used apps according to the embodiment of the present disclosure can extract and recommend the frequently used apps in the driving situation based on the app execution order.

In other words, the frequently used apps can be extracted and recommended according to various conditions, not one condition. Therefore, it is possible to avoid biased extraction and recommendation of the frequently used apps, and the frequently used apps can be extracted more objectively.

Further, in order to achieve the above-described objects, the apparatus for expressing frequently used apps according to the embodiment of the present disclosure can include: a memory configured to collect app usage information in at least one of a daily time period, a pre-bedtime period, and a driving situation, and learn an app usage pattern using an artificial intelligence algorithm based on the collected app usage information; and a microprocessor configured to extract and recommend frequently used apps in the daily time period, the pre-bedtime period, and the driving situation, based on the learned app usage pattern.

Further, in order to achieve the above-described objects, the processor of the apparatus for expressing frequently used apps according to the embodiment of the present disclosure can include a first processor for extracting the first frequently used app based on any one of an app usage frequency and the app execution order.

Further, in order to achieve the above-described objects, the processor of the apparatus for expressing frequently used apps according to the embodiment of the present disclosure can include a second processor for extracting the second frequently used app based on both the app usage frequency and the app usage time.

Further, in order to achieve the above-described objects, the processor of the apparatus for expressing frequently used apps according to the embodiment of the present disclosure can include a third processor for extracting the third frequently used app based on only the app usage time.

In other words, by extracting the most preferred app depending on the time period and the situation in which the user terminal is used, the user can use the most preferred app without having to search for the most preferred app.

In order to achieve the above-described objects, in the apparatus for expressing frequently used apps according to the embodiment of the present disclosure, the app having the maximum frequency proximity can be determined, based on the frequency proximity obtained by quantifying the app usage frequency, as the first frequently used app in the daily time period and the pre-bedtime period.

Further, in order to achieve the above-described objects, in the apparatus for expressing frequently used apps according to the embodiment of the present disclosure, the app having the maximum order proximity can be determined, based on the order proximity obtained by quantifying the app execution order, as the first frequently used app in the driving situation.

In other words, in extracting the most preferred app depending on the time period and the situation, by applying different processors, it possible to more accurately extract and recommend the preferred app suitable for the time period and the situation.

In order to achieve the above-described objects, in the apparatus for expressing frequently used apps according to the embodiment of the present disclosure, the second frequently used app in the daily time period and the pre-bedtime period can be determined based on the favorite score determined by both the frequency proximity and the app usage time. Further, the second frequently used app in the driving situation can be determined based on the favorite score determined by both the order proximity and the app usage time.

In order to achieve the above-described objects, in the apparatus for expressing frequently used apps according to the embodiment of the present disclosure, the third frequently used app in the daily time period and the pre-bedtime period can be determined based on the usage time proximity determined only by the app usage time. Further, the third frequently used apps in the driving situation can be determined based on the usage time proximity determined only by the app usage time.

In other words, after the most preferred first frequently used app is extracted depending on the time period and the situation, the second frequently used app and the third frequently used app can be extracted according to different conditions, such as the app usage time and the app usage frequency. By extracting the first frequently used app and the second and third frequently used apps according to different conditions, it is possible to avoid biased extraction of the apps.

In accordance with the method of expressing frequently used apps and the apparatus for expressing frequently used apps using the same according to the embodiment of the present disclosure, it is possible to collect the app usage information, learn the collected app usage information using the artificial intelligence algorithm, and extract and recommend the frequently used apps. Therefore, even if the app usage information changes over time, the frequently used apps suitable for the time periods and the situations can be extracted and recommended. Further, since the frequently used apps are displayed on the user terminal, the user of the user terminal can easily execute the frequently used apps without having to search for the apps.

Further, in accordance with the method of expressing frequently used apps and the apparatus for expressing frequently used apps using the same according to the embodiment of the present disclosure, it is possible to simultaneously extract the frequently used apps in the daily time period and the frequently used apps in the pre-bedtime period. Particularly, by displaying the frequently used apps in the daily time period in a different position from the frequently used apps in the pre-bedtime period, and extracting the frequently used apps such that the frequently used apps in the daily time period do not overlap with the frequently used apps in the pre-bedtime period, the favorite score of the frequently used apps in the respective time periods can be easily checked.

Similarly, the frequently used apps in the driving situation are extracted together with the frequently used apps in the daily time period. By displaying the frequently used apps in the driving situation in a different position from the frequently used apps in the daily time period and extracting the frequently used apps such that the frequently used apps in the driving situation do not overlap with the frequently used apps in the daily time period, the favorite score of the frequently used apps in the specific situation can be easily checked.

Further, in accordance with the method of expressing frequently used apps and the apparatus for expressing frequently used apps using the same according to the embodiment of the present disclosure, the conditions for extracting the first frequently used app are different from the conditions for extracting the second and third frequently used apps, which makes it possible to avoid biased extraction of the frequently used apps.

Further, in order to achieve the above-described objects, collecting application usage information for applications of the device in at least any one of a time period of a day and a user activity, determining an application usage pattern based on the collected application usage information and determining frequently used applications in the time period of a day and the user activity based on the determined application usage pattern and displaying the determined frequently used applications, wherein the determining and displaying the frequently used applications includes, determining the frequently used applications in the time period of the day based on an application usage frequency in the time period of the day and determining the frequently used applications in the user activity based on an application execution order in the user activity.

Further, in order to achieve the above-described objects, a memory configured to collect application usage information in at least any one of a time period of a day and a user activity and at least one processor configured to determine an application usage pattern based on the collected application usage information and determine and display frequently used applications in the time period of a day or the user activity based on the determined application usage pattern, wherein the processor is configured to determine and display frequently used applications in the time period of the day based on an application usage frequency in the time period of the day, and frequently used applications in the driving situation based on an application execution order in the user activity.

Further, in accordance with the method of expressing frequently used apps and the apparatus for expressing frequently used apps using the same according to the embodiment of the present disclosure, the conditions for extracting the most preferred app in the daily time period and the pre-bedtime period are different from the conditions for extracting the most preferred app in the driving situation, which makes it possible to extract the frequently used apps suitable for the time periods and the situations.

BRIEF DESCRIPTION OF THE DRAWINGS

FIG. 2 shows an example in which conditions for expressing the frequently used apps are applied differently depending on the frequently used app.

FIG. 11 illustrates an example of extracting the frequently used apps among apps used during one day in order to express the frequently used apps according to an embodiment of the present disclosure.

FIG. 12 illustrates an example of integrating app usage data for expressing frequently used apps according to an embodiment of the present disclosure.

FIG. 13 illustrates an example of expressing frequently used apps based on the integrated data shown in FIG. 12.

DETAILED DESCRIPTION

Figure 1:
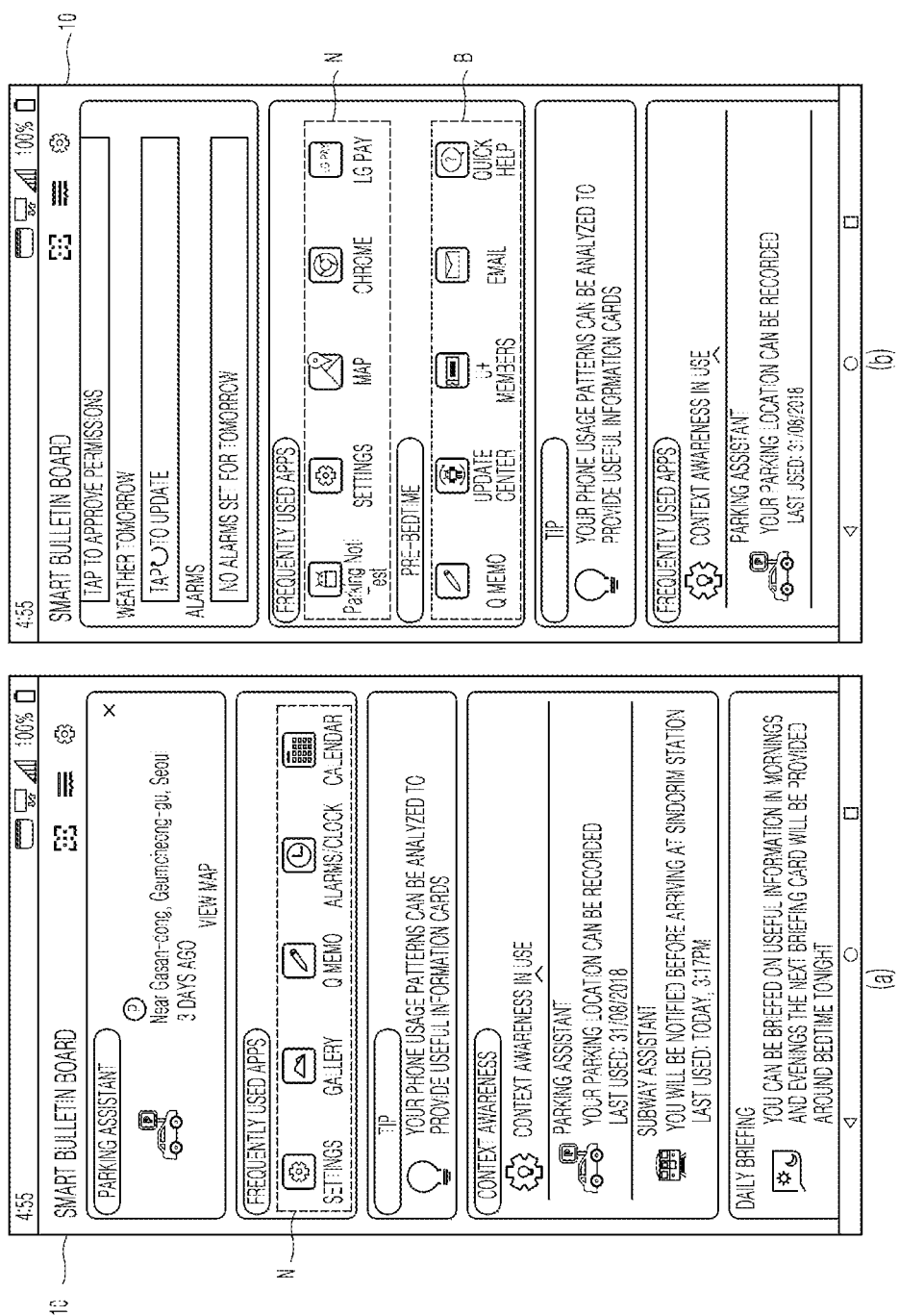
FIG. 1 illustrates a user terminal in which frequently used apps are expressed by a method of expressing frequently used apps according to an embodiment of the present disclosure. In (a) and (b) of FIG. 1, the frequently used apps according to time periods and situations are indicated by dotted lines.

Hereinafter, embodiments of the present disclosure will be described in detail with reference to the accompanying drawings. Like reference numerals will be given to like parts throughout the detailed description of the embodiments.

Like reference numerals in the respective drawings denote like elements. Further, the specific structural or functional description of the embodiments of the present disclosure disclosed herein is merely illustrative for the purpose of illustrating the embodiments of the present disclosure. Unless differently defined, all of the terms used herein, including technical or scientific terms, have the same meanings as those generally understood by those skilled in the art to which the present disclosure pertains. The terms defined in a generally used dictionary are to be construed as the same meanings as those understood in the context of the related art. Unless specified clearly herein, the terms are not to be construed in an ideal or excessively formal sense.

Figure 2:
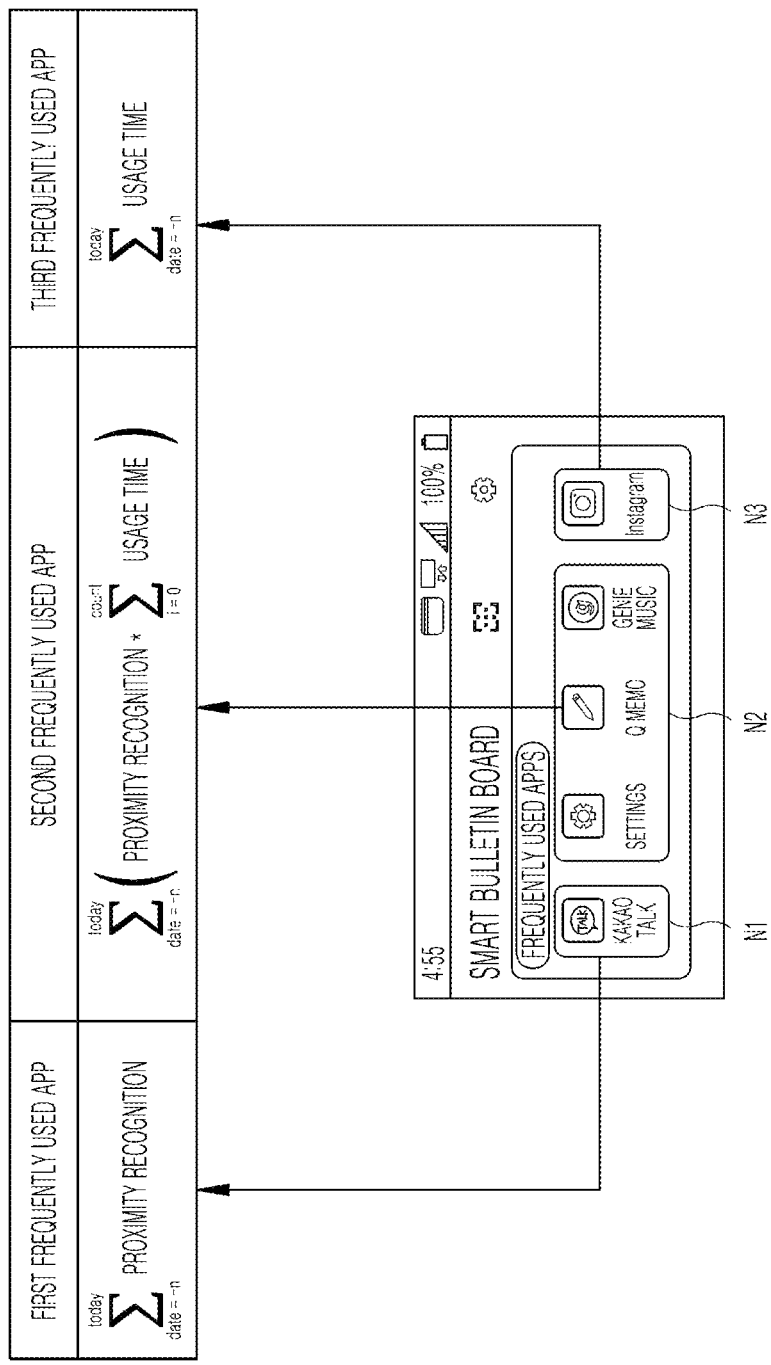
FIG. 2 illustrates conditions for expressing the frequently used apps illustrated in FIG. 1.

FIG. 1 illustrates a user terminal in which frequently used apps are expressed by a method of expressing frequently used apps according to an embodiment of the present disclosure. FIG. 2 illustrates conditions for expressing the frequently used apps shown in FIG. 1.

An apparatus for expressing frequently used apps according to an embodiment of the present disclosure can be a user terminal 10 in which an app can be executed. For example, the apparatus for expressing frequently used apps can be any one of various devices such as a smartphone, a tablet PC, a laptop computer, and the like. Hereinafter, in the embodiment of the present disclosure, the case in which the apparatus for expressing frequently used apps is a smartphone will be described. For convenience of description, the apparatus for expressing frequently used apps will be referred to as "user terminal 10" or a "device." All the components of the apparatus and the user terminal 10 according to all embodiments of the present disclosure are operatively coupled and configured.

Various apps are installed and executed in the user terminal 10 according to the embodiment of the present disclosure. Among them, a plurality of apps frequently used by a user of the user terminal 10 is displayed. Specifically, frequently used apps are selected based on the preference of the user of the user terminal 10, and the selected preferred apps are displayed on a screen of the user terminal 10. Accordingly, the user can use the preferred apps easily and quickly.

In other words, the user of the user terminal 10 can see the apps that have been frequently executed during a certain period of time using a widget, which is a mini application program that allows the user to directly access functions such as a weather function, a calendar function, a calculator function, and the like, and information such as news, games, and the like, without using a web browser in the user terminal 10. By displaying the user's frequently used apps on the user terminal 10, the user can easily execute the preferred apps.

Different types of apps can be displayed in the frequently used apps depending on the user's time period and situation. For example, the time period and the situation in which the user terminal 10 is used can be classified according to various conditions. In the embodiment of the present disclosure described below, for convenience of description, the time periods will be classified into a daily time period N in which the user uses the user terminal 10, a pre-bedtime period B in which the user gets ready to go to bed, and a driving situation D in which the user is driving.

Different types of frequently used apps can be displayed on the user terminal or a device 10 depending on the time period and the situation classified in the above-described manner. Specifically, the frequently used apps in the daily time period N can be a settings app, a gallery app, a clock app, and the like, as shown in (a) of FIG. 1. Alternatively, the frequently used apps in the pre-bedtime period B, which is a specific time period, can be a memo app, an e-mail app, and the like, as shown in (b) of FIG. 1. At this time, the frequently used apps in the pre-bedtime period B can be displayed together with the frequently used apps in the daily time period N, which makes it possible to easily check a favorite score of the frequently used apps in the respective time periods and situations. In embodiments of the invention, reference to extracted includes items or apps being determined or identified as well.

At this time, about five frequently used apps are displayed on the user terminal 10. The selected apps can be extracted according to the same conditions. In another embodiment, the selected apps can be extracted according to different conditions.

According to the embodiment of the present disclosure, the frequently used apps in the daily time period N can be extracted according to a plurality of conditions, for example. Specifically, referring to FIG. 2, app usage information can be collected. When the apps are extracted based on the collected app usage information, a first frequently used app N1 having a maximum frequency proximity can be extracted based on a frequency proximity obtained by quantifying the app usage frequency. The first frequently used app extracted based on the above condition can be a messenger app.

Next, a second frequently used app N2 can be extracted from the remaining apps excluding the first frequently used app. At this time, the second frequently used app can be extracted based on the favorite score determined by the frequency of usage of the app and the usage time of the app. At this time, a plurality of second frequently used apps can be extracted in descending order of favorite score. The second frequently used apps extracted based on the above conditions can be a settings app, a memo app, a music app, and the like.

After the first and the second frequently used apps N1 and N2 are extracted, a third frequently used app N3 can be extracted from the remaining apps excluding the first and the second frequently used apps. The third frequently used app can be extracted based only on the usage time of the app. The third frequently used app extracted based on the above condition can be an SNS app.

The first to the third frequently used apps can be extracted based on the app usage information collected during at least one day. Preferably, the first to the third frequently used apps are extracted based on the app usage information collected over 4 to 7 days.

In the embodiment of the present disclosure, in extracting the frequently used apps, one app is extracted as the most preferred app; a plurality of apps is extracted as next frequently used apps; and one app is extracted as a last frequently used app. However, the number of apps to be extracted can vary.

Since the user uses different apps while using the user terminal 10, the types of the frequently used apps can change after a certain period of time elapses. Hereinafter, this will be described in detail with reference to FIG. 3.

Figure 3:
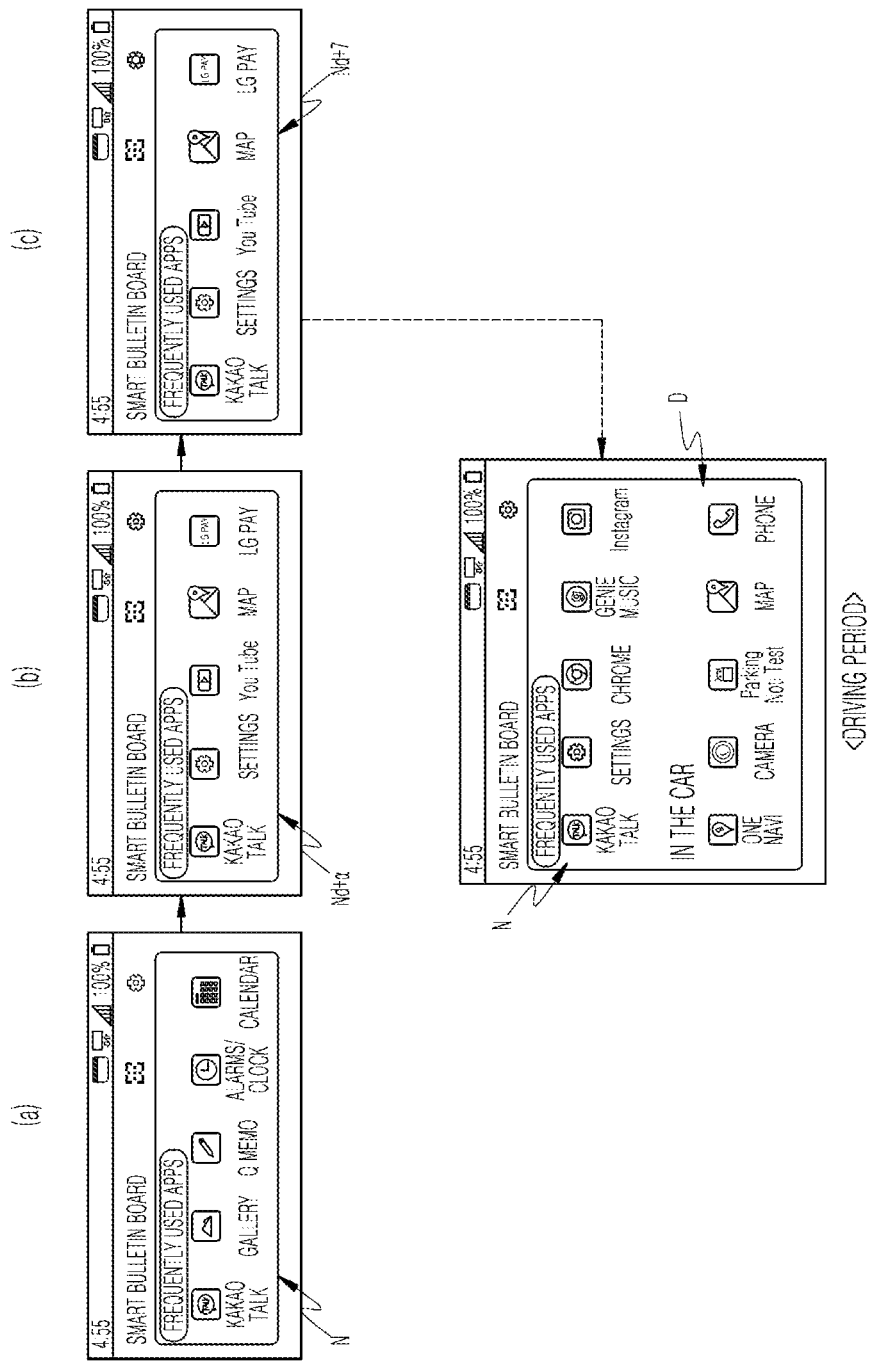
FIG. 3 illustrate an example in which frequently used apps change as time elapses, in which frequently used apps in a daily time period and used apps in a driving situation are expressed together.

FIG. 3 illustrates an example in which the frequently used apps change as time elapses.

It is assumed that (a) of FIG. 3 illustrates a state in which the user terminal 10 is used by a user for the first time. When the user terminal 10 is used by the user for the first time, there is no app usage history. Therefore, the frequently used apps in the daily time period N can be extracted and recommended according to conditions set in the user terminal 10. Specifically, when the user terminal 10 is used by the user for the first time, the frequently used apps in the daily time period N can be a settings app for setting details of the user terminal 10, a gallery app for showing photos, a time app for checking the time, and the like. In embodiments of the invention, reference to recommended includes elements or apps being displayed.

After a certain period of time (Nd+α_d: date) elapses, the usage history of the apps frequently used by the user for dates (d+α) from the day when the user terminal 10 is used for the first time remains. For example, when one day has elapsed from the day when the user terminal 10 is used for the first time, the app usage data collected during the one day can be stored in the user terminal 10, and the frequently used apps can be extracted and recommended based on the stored app usage data (see (b) of FIG. 3). Specifically, a messenger app, a settings app, a map app, and the like can be displayed.

After a certain period of time has further elapsed, the frequently used apps in the daily time period N, which have changed as time elapsed, are extracted (see (c) of FIG. 3). For example, on the assumption that seven days have elapsed after a certain period of time has elapsed from the day when the user terminal 10 was used for the first time (Nd+7), the app usage data collected over seven days can be stored in the user terminal 10. At this time, the app usage data collected over the most recent four days out of the seven days are integrated, instead of using all the stored app usage data; and five preferred apps are thereby extracted.

From the day when the user terminal 10 is used for the first time, while the user is using the user terminal 10, the app usage data in a specific situation such as the driving situation D, other than the daily time period N, can be stored. If the app usage data in the driving situation D has been stored, when the user is in the driving situation D, the frequently used apps in the daily time period N and the frequently used apps in the driving situation D can be extracted and displayed simultaneously on the user terminal (see (d) of FIG. 3).

At this time, the frequently used apps can be recommended such that the frequently used apps in the daily time period N do not overlap with the frequently used apps in the driving situations D. For example, the frequently used apps in the daily time period N are displayed at a different position from where the frequently used apps in the driving situation D are displayed, and the types of the frequently used apps in the daily time period N and the frequently used apps in the driving situation D, and the like, do not overlap with one another. Accordingly, the user of the user terminal 10 can accurately recognize the apps which are mainly used in the respective time periods and situations.

When the user's driving situation D is terminated, the frequently used apps in the driving situation D are removed, and thus only the frequently used apps in the daily time period N can be extracted. Accordingly, it is possible to minimize confusion between the time periods and the situations in which the user terminal 10 is used. The features of the method of expressing frequently used apps will be described in detail with reference to the drawings below.

Hereinafter, an apparatus for expressing frequently used apps extracted depending on the time period and the situation will be described in detail with reference to the drawings.

Figure 4:
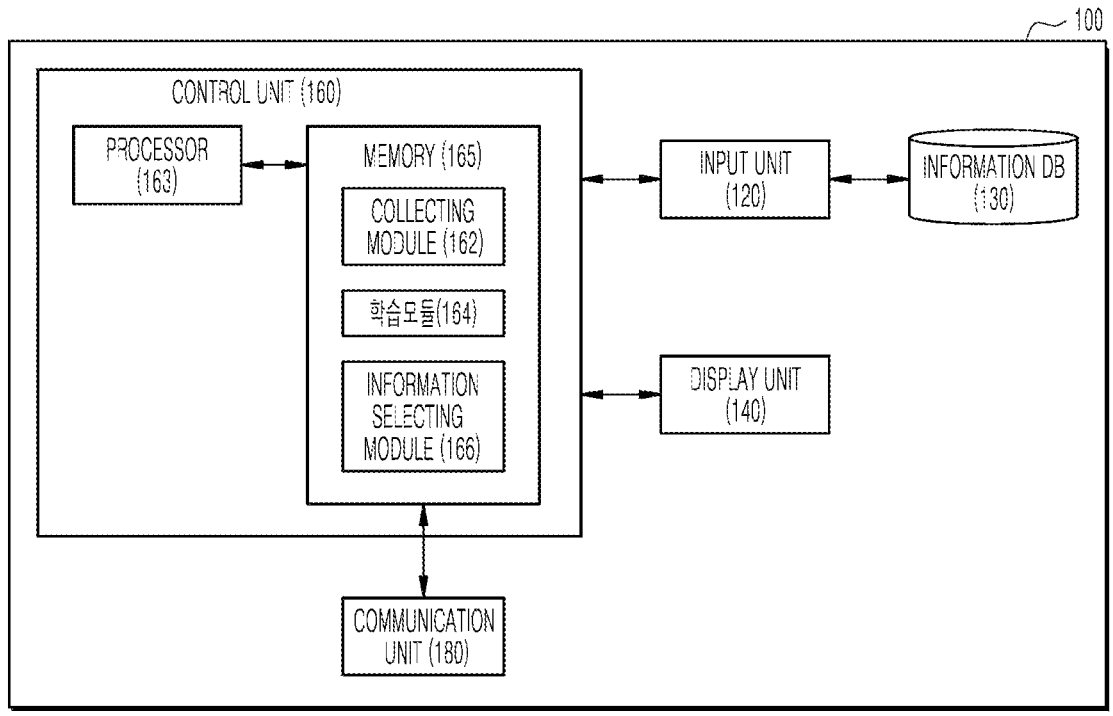
FIG. 4 is a block diagram illustrating a schematic configuration of an apparatus for expressing frequently used apps according to an embodiment of the present disclosure.
Figure 5:
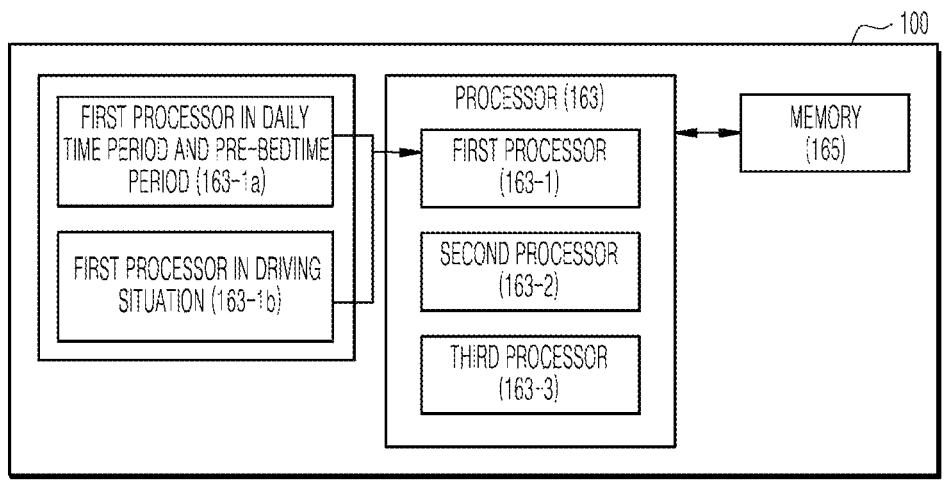
FIG. 5 is a block diagram illustrating schematic configurations of a processor and a memory according to the embodiment of the present disclosure shown in FIG. 4.

FIG. 4 is a block diagram showing a schematic configuration of the apparatus for expressing frequently used apps according to an embodiment of the present disclosure. FIG. 5 is a block diagram showing schematic configurations of a processor and a memory according to the embodiment of the present disclosure shown in FIG. 4.

First, an apparatus 100 for expressing frequently used apps according to the embodiment of the present disclosure can include a memory 165 and a processor 163.

The apparatus 100 for expressing frequently used apps according to the embodiment of the present disclosure can be an apparatus for collecting apps using 5th Generation mobile communication technology (5G) having a maximum speed of about 20 Gbps, learning a usage pattern of the collected apps, and extracting frequently used apps using the learned app usage pattern. In embodiments of the invention, reference to learned includes an element or an app being determined or identified.

Further, the apparatus 100 for expressing frequently used apps according to the embodiment of the present disclosure can be the user terminal 10 (see FIG. 1) such as a tablet, a smartphone, or the like, which is a smart device in which apps can be installed. In the embodiment of the present disclosure, a smartphone will be described as an example.

Specifically, referring to the drawings, the memory 165 of the apparatus 100 for expressing frequently used apps can collect app usage information for expressing the frequently used apps in a daily time period N, a pre-bedtime period B, and a driving situation D in which the apparatus 100 for expressing frequently used apps, e.g., the user terminal, is used.

In other words, on the assumption that the user mainly uses a messenger app, a camera app, a gallery app, and the like during a certain time period, the memory 165 can collect the usage information of these apps. The app usage information collected by the memory 165 can be used for learning an app usage pattern of apps mainly used in the apparatus 100 for expressing frequently used apps.

In other words, the app usage pattern can be learned via an artificial intelligence algorithm based on the collected app usage information. If the app usage pattern has been learned, when it is determined that the user terminal 10 is being used by the user in the daily time period N based on the app usage pattern learned by the processor 163, the frequently used apps in the daily time period N are extracted and recommended based on the determination result.

In other words, if it is determined that the user uses the user terminal 10 in a specific time period based on the app usage pattern learned in the specific time period, the apps mainly used in the specific time period, such as a messenger app, a camera app, a gallery app, and the like, are displayed on the screen of the apparatus for expressing frequently used apps. Accordingly, the user can easily select and execute the frequently used apps, without having to search for a desired app.

At this time, the processor 163 can include reference information for determining the time periods and the situations, and conditions for extracting the frequently used apps depending on the time period and the situation, in order to recommend the frequently used apps.

Specifically, the processor 163 can include a first processor 163-1 for extracting a first frequently used app based on any one of the frequency of usage of the app and an app execution order. At this time, the processor 163 can include a plurality of processors capable of extracting frequently used apps according to different conditions depending on the time period and the situation.

More specifically, the first processor 163-1 can include a first processor 163-1a for extracting a first frequently used app in the daily time period N and the pre-bedtime period B. In other words, the most frequently used app in the daily time period N and the most frequently used app in the pre-bedtime period B can be extracted according to the same condition. Specifically, the first frequently used app in the daily time period and the pre-bedtime period can be extracted based on a frequency proximity obtained by quantifying the app usage frequency.

The frequency proximity indicates a score for the number of times of execution of the app. A highest score (e.g., 10 points) is given to the most frequently executed app. A second highest score is given to a second most frequently used app. In this manner, the apps are listed in descending order of usage frequency. At this time, different scores can be given to the apps having the same number of times of execution based on an app usage time. 1 point can be given to 10th and subsequent apps.

Alternatively, the first processor 163-1 can include a first processor 163-1b in the driving situation. The first processor 163-1b in the driving situation extracts a first frequently used app in the driving situation, to which a maximum order proximity is given based on the order proximity obtained by quantifying the app execution order.

By extracting the most preferred app based on different conditions depending on the time period and the situation, it is possible to prevent the preferred app from being extracted based on only one standard; and accordingly, biased app recommendation can be avoided.

Once the most preferred app has been extracted depending on the time period and the situation, next preferred apps can be extracted. In order to extract the next preferred app, the processor 163 can include a second processor 163-2 and a third processor 163-3.

Specifically, the second processor 163-2 can extract a plurality of apps in descending order of favorite score while considering both the previously extracted frequency proximity and the app usage time. In the embodiment of the present disclosure, one app is extracted as the most preferred app, and then about three apps are extracted as next preferred apps. However, the number of apps to be extracted can vary depending on the conditions.

The third processor 163-3 can extract a third frequently used app, which after the second frequently used app is the last preferred app. The third frequently used app can be extracted based on a usage time proximity determined only by the app usage time. Specifically, the app used for a longest period of time can be extracted.

By extracting the preferred apps based on various conditions, it is possible to extract the preferred apps more objectively and accurately.

The apparatus 100 for expressing frequently used apps according to the embodiment of the present disclosure can include an input unit 120, a display unit 140, a control unit 160, a communication unit 180, and an information DB 130, in addition to the memory 165 and the processor 163, in order to express the frequently used apps.

The input unit 120 can generate an app execution signal for executing an app in the apparatus 100 for expressing frequently used apps. The generated app execution signal can be transmitted to the control unit 160 and used for extracting the frequently used apps.

The control unit 160 can collect and learn the app execution signals. Based on the learning result, the control unit 160 can recommend the frequently used apps depending on the time period and the situation in which the apparatus 100 for expressing frequently used apps is used. For this purpose, the control unit 160 can include a collecting module 162, a learning module 164, and an information selecting module 166.

Specifically, the collecting module 162 can collect the app execution signals transmitted to the control unit 160. The learning module 164 can learn the apps executed by the collected app execution signals. At this time, the learning module 164 can learn the execution signals of the frequently used apps in one of the daily time period N, the pre-bedtime period B, and the driving situation D. The information selecting module 166 can extract the app corresponding to the time period and the situation in which the user uses the apparatus 100 for expressing frequently used apps based on the learning result of the learning module 164.

The communication unit 180 can receive information on whether the control unit 160 learns the app in response to an app execution input of the user, or whether an app corresponding to the time period and the situation in which the apparatus 100 for expressing frequently used apps is used is extracted.

The information DB 130 can store app execution input information inputted at the input unit 120. For this purpose, the information DB 130 can include a storage unit capable of storing the app execution input information.

By automatically extracting and recommending the user's frequently used apps based on the information on the apps executed while the user terminal 10 is being used, the user can save time and effort otherwise spent searching for the frequently used apps.

Hereinafter, a process of expressing frequently used apps will be described with reference to the drawings.

Figure 6:
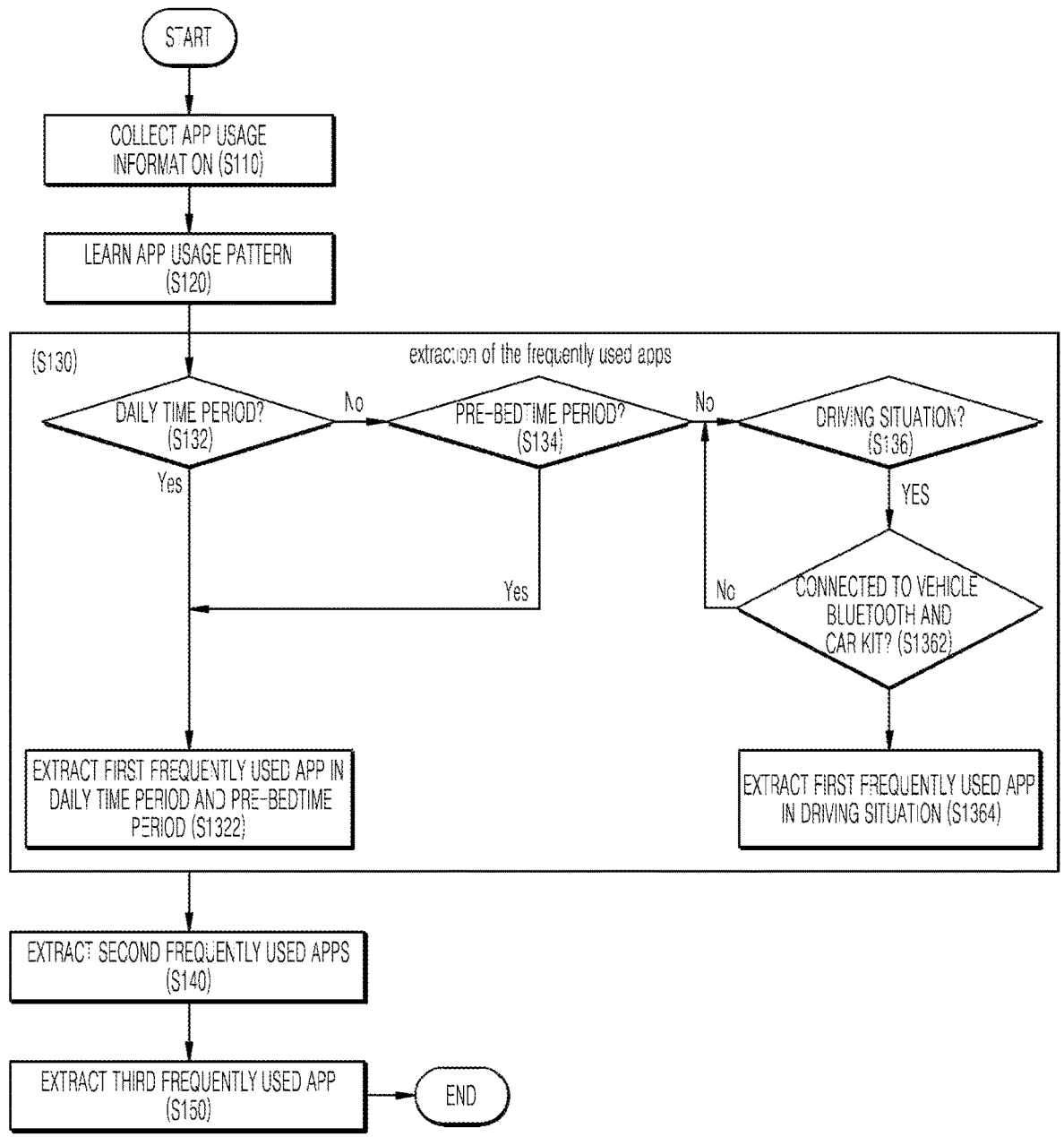
FIG. 6 is a flowchart illustrating a method of expressing frequently used apps according to an embodiment of the present disclosure.

FIG. 6 is a flowchart showing a method of expressing frequently used apps according to an embodiment of the present disclosure.

Like reference numerals will be used for like parts as those in the apparatus and the configuration described in FIGS. 1 to 5, and redundant description thereof will be omitted.

Figure 7:
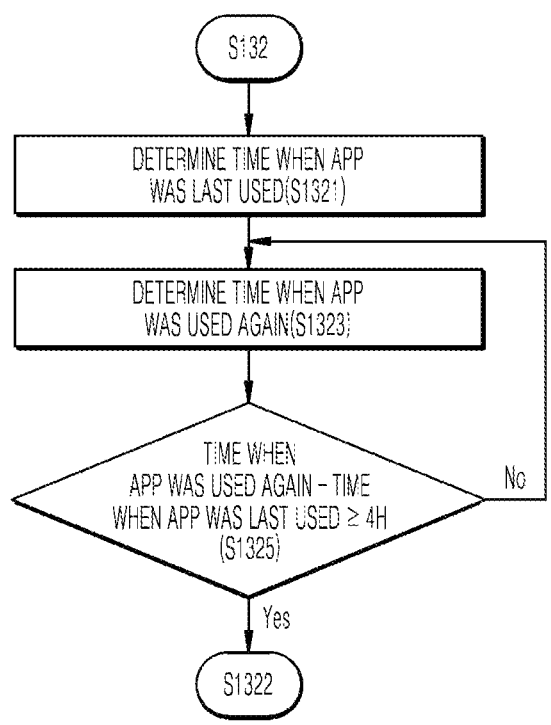
FIG. 7 is a flowchart illustrating the method of expressing frequently used apps in a specific time period shown in FIG. 6, and shows an example of expressing frequently used apps in a pre-bedtime period.
Figure 8:
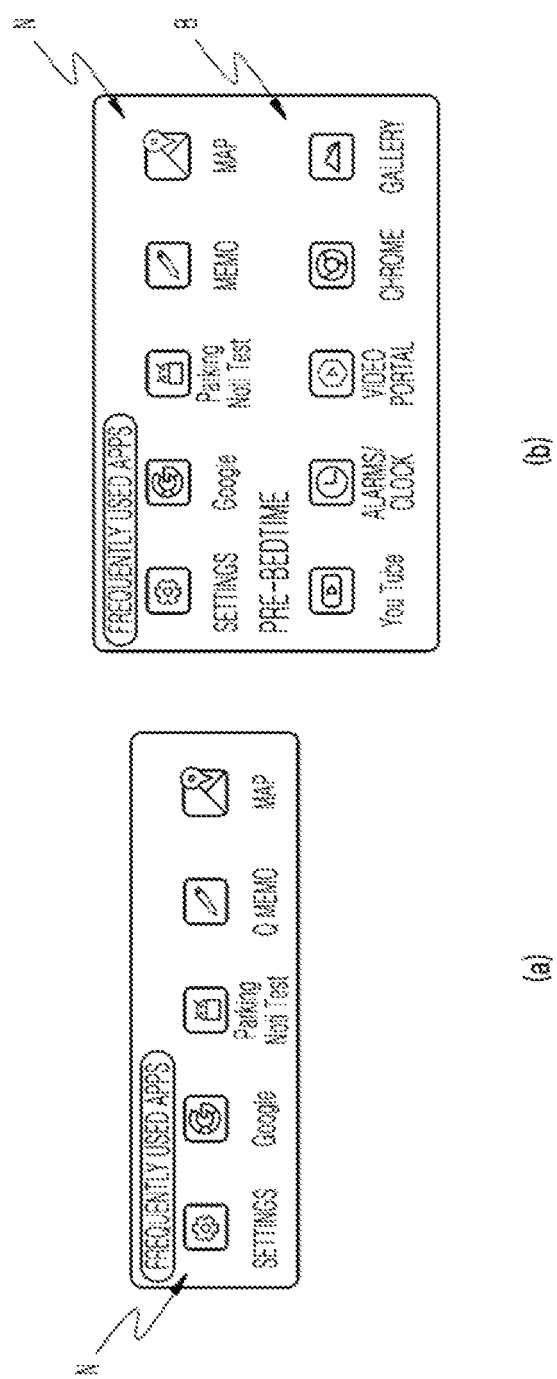
FIGS. 8A and 8B illustrate an example of expressing the frequently used apps in the daily time period and the frequently used apps in the pre-bedtime period.

An apparatus for expressing frequently used apps described in FIGS. 6 to 8 can be any one of a smartphone, a tablet, and the like in which apps can be installed and executed. In the following description, the apparatus for expressing frequently used apps will be referred to as "user terminal 10" (see FIG. 1).

First, referring to FIG. 6, the method of expressing frequently used apps according to the embodiment of the present disclosure can include: collecting app usage information using the apparatus for expressing frequently used apps (S110); learning the collected app usage information (S120); and extracting frequently used apps using an artificial intelligence algorithm based on the learned app usage information, and recommending the extracted frequently used apps (S130, S140, and S150).

In order to collect the app usage information in the respective time periods and the situations, the app usage information in any one of a daily time period, a pre-bedtime period, and a driving situation in which the app is used is collected (S110).

At this time, the app usage information can be collected according to different conditions depending on the time period and the situation in which the apps are used. Specifically, for the app usage information in the daily time period N, information on the app used during a day can be collected. For the app usage information in the pre-bedtime period B, information on the apps used for two to three hours before bedtime, which is a period of time before a predetermined time, can be collected. Further, for the app usage information in the driving situation D, information on the apps used when the user terminal 10 is connected to one system among systems of a vehicle, such as Bluetooth and a car kit, can be collected.

When collecting the app usage information, the recent app usage information can be collected. For example, the app usage information from the recent four days during which the user terminal 10 has been used can be collected and integrated to express about five preferred apps. In this case, app usage information of at least one day is required. If there is no recent app usage information, the app usage information of the recent 30 days at maximum can be collected and integrated.

When the app usage information is collected, the collected app usage information can be learned (S120). At this time, the app usage information of the apps used depending on the time period and the situation is learned, and thus it is possible to recommend an app suitable for each time period or situation in which the user terminal 10 is used by the user.

The app learning time can vary depending on the time period and the situation in which the apps are used. For example, the apps collected in the daily time period N can be learned between 2 AM and 4 AM every day, on the assumption that the user of the user terminal 10 is asleep between 2 AM and 4 AM and does not use the apps between said times. Alternatively, the apps collected in the pre-bedtime period B can be learned between 10 AM and 11 AM every day. As described above, the user of the user terminal 10 is generally asleep in the early hours of the morning, and awake after 7 AM. Therefore, the app usage information collected during the pre-bedtime period B can be learned between 10 AM and 11 AM, at which the user is expected to be awake. The app usage information collected during the driving situation D can be learned between 3 AM and 4 AM every day. Generally, driving is performed in the daytime, and thus the app usage information collected in the driving situation D can be learned between 3 AM and 4 AM in the early hours of the morning.

In the embodiment of the present disclosure, the app learning time was described based on general situations. However, the app learning time can be changed autonomously by means of artificial intelligence learning, depending on the situation of the user of the user terminal 10.

By learning the app usage information suitable for the time periods and the situations, it is possible to extract and recommend user's frequently used apps depending on the time period and the situation in which the user terminal 10 is used, based on the learned app usage pattern.

Specifically, it is possible to extract the frequently used apps in the daily time period N and the frequently used apps in the pre-bedtime period B based on the app usage frequency. More specifically, the frequently used apps in the daily time period N and the frequently used apps in the pre-bedtime period B can be extracted based on a frequency proximity obtained by quantifying the app usage frequency. At this time, the app having a maximum frequency proximity can be extracted as a first frequently used app in the daily time period and the pre-bedtime period (S132, S134, and S1322).

The frequency proximity indicates a score for the number of times of execution of the app. A highest score (e.g., 10 points) is given to the most frequently executed app. A second highest score is given to a second most frequently executed app. In this manner, the apps are listed in descending order of usage frequency. At this time, different scores can be given to the apps having the same number of times of execution based on an app usage time. 1 point can be given to 10th and subsequent apps.

After the first frequently used app in the daily time period and the pre-bedtime period are extracted using the above-described algorithm, second frequently used apps can be extracted based on both the frequency proximity and a favorite score (S140). Specifically, the second frequently used apps can be extracted based on the product of the app usage time and the frequency proximity used for extracting the first frequently used apps in the daily time period and the pre-bedtime period.

Thereafter, a third frequently used app can be extracted based on the usage time proximity determined only by the app usage time (S150). The usage time proximity indicates the longest usage time of the app excluding the previously extracted first and second frequently used apps. By extracting the apps according to the above conditions, about five apps can be extracted and recommended as the frequently used apps.

Alternatively, when the user terminal 10 is used in the driving situation D, the first frequently used app in a most preferable driving situation can be extracted based on an order proximity determined by an app execution order (S136).

In case of the order proximity, in a state in which the user terminal 10 is connected to a system of a vehicle in the driving situation D as described above (S1362), a highest score (e.g., 10 points) is given to the app executed first, and a next highest score is given to the app executed next.

Since the condition for expressing the most preferred app in the driving situation D is different from the condition for expressing the most preferred app in the daily time period N and the pre-bedtime period B, it is possible to more objectively extract the preferred apps depending on the time period and the situation (S1364).

Thereafter, a second frequently used app and a third frequently used app in the driving situation D can be extracted according to the same conditions as the above-described conditions for extracting the second frequently used app and the third frequently used app.

In order to extract the frequently used apps as described above, different conditions are applied depending on the time period and the situation. Hereinafter, conditions for extracting the frequently used apps in the pre-bedtime period B will be described in detail with reference to FIG. 7.

FIG. 7 is a flowchart illustrating a method of expressing frequently used apps in a specific time period shown in FIG. 6. FIGS. 8A and 8B illustrate an example of extracting frequently used apps in the daily time period and frequently used apps in the pre-bedtime period.

In order to express the frequently used apps in the pre-bedtime period B, the time when the app was last used is determined (S1321). During bedtime, behaviors such as the execution of apps and the like do not occur. Therefore, if the app is not used for a certain period of time after the time when the app was last used, it is determined that the user is asleep.

After a certain period of time elapses, the user can wake up and execute the app in the user terminal 10 again. At this time, whether at least four hours have elapsed from the time when the app was last used until the time when the app is executed again can be determined (S1323 and S1325). If it is determined that at least four hours have elapsed from the time when the app was last executed until the time when the app is executed again, the time period from the time when the app was last used until a predetermined time can be determined as the pre-bedtime period B. For example, the time period from the time when the app was last used to the predetermined time can be about 2 to 3 hours. This time period can vary depending on the conditions.

At this time, if it is determined that the app is executed before four hours have elapsed since the time when the app was last used, the app usage time, i.e., the app loading time, is checked. If the app loading time is within a predetermined period of time, it can be determined that the user terminal is in the pre-bedtime period B. Specifically, the user can check the current time using the user terminal 10 during sleep hours. In this case, the user can check the user terminal 10 by turning on the screen of the user terminal 10 instead of executing the app. Accordingly, in such a case, since it is preferable to determine that the user terminal 10 is in the pre-bedtime period B, it is not determined that the app was executed again.

By determining the pre-bedtime period B, when it is the pre-bedtime period B, it is possible to extract and recommend the frequently used apps in the pre-bedtime period B (S1322, S140, and S150).

At this time, the frequently used apps in the pre-bedtime period B can be extracted and recommended by learning the usage information of the frequently used apps in the previous pre-bedtime period B.

The frequently used apps in the pre-bedtime period B can be extracted and recommended together with the frequently used apps in the daily time period N. In other words, as shown in FIGS. 8A and 8B, the frequently used apps in the pre-bedtime period B and the frequently used apps in the daily time period N can be simultaneously displayed on the screen of the user terminal 10. By separately displaying the frequently used apps in the specific time period, the user can recognize a current specific time period (pre-bedtime period).

The frequently used apps can be recommended such that the frequently used apps in the pre-bedtime period B and the frequently used apps in the daily time period N do not overlap with one another. If some of the frequently used apps in the daily time period N overlap with some of the frequently used apps in the pre-bedtime period B, the overlapping frequently used apps in the pre-bedtime period B need not be displayed.

Further, the frequently used apps in the pre-bedtime period B can be displayed below the frequently used apps in the daily time period N, so that the frequently used apps in the daily time N stand out.

The frequently used apps in the pre-bedtime period B can be automatically deleted after a certain period of time elapses since the last execution thereof. This is because the user in the pre-bedtime period B cannot remove the frequently used apps from the pre-bedtime period B.

The driving situation D was described as an example in order to explain the method of expressing the frequently used apps depending on the time period and the situation. The conditions for extracting the frequently used apps in the driving situation D will now be described in detail with reference to FIGS. 9 and 10.

Figure 9:
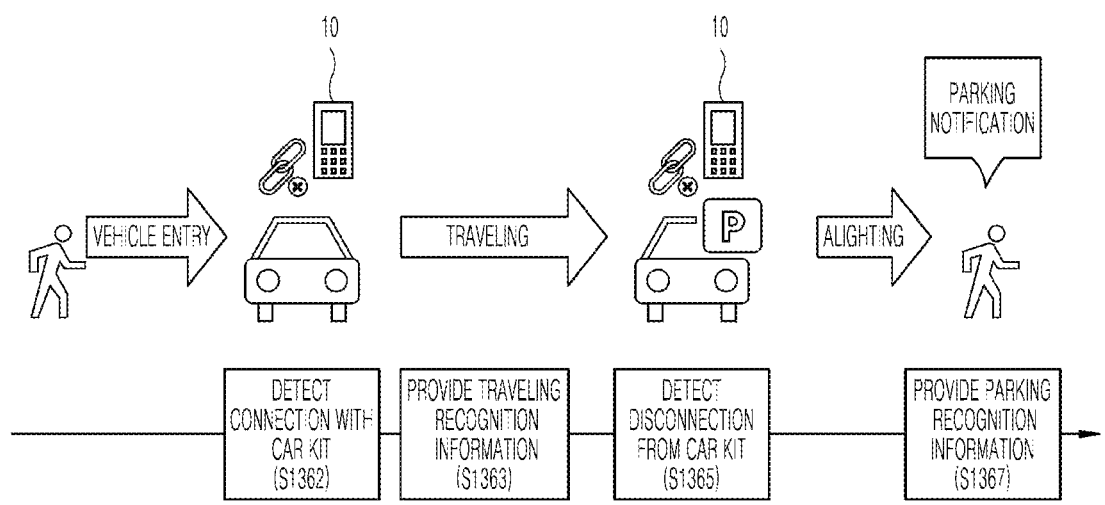
FIG. 9 is a flowchart illustrating a method of expressing frequently used apps in a specific situation shown in FIG. 6, and shows an example of expressing the frequently used apps in the driving situation.
Figure 10:
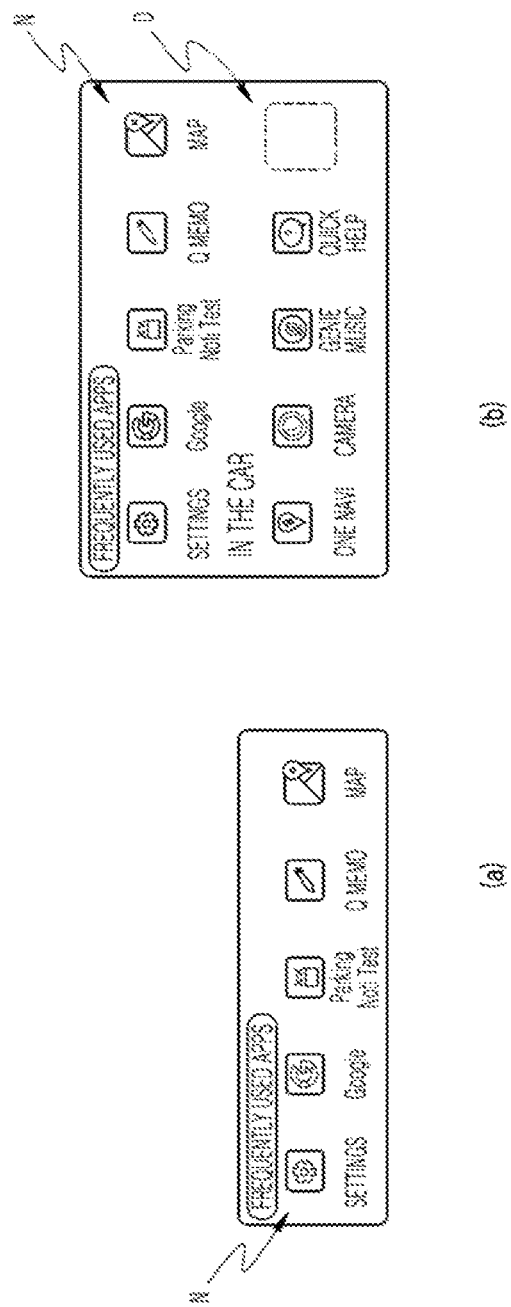
FIGS. 10A and 10B show an example of extracting the frequently used apps in a daily time period and the frequently used apps in the driving situation.

FIG. 9 is a flowchart illustrating a method of expressing frequently used apps in a specific situation shown in FIG. 6. FIGS. 10A and 10B illustrate an example of extracting the frequently used apps in the daily time period and the frequently used apps in the driving situation.

Referring to the drawings, in order to extract the frequently used apps in the driving situation D, it is necessary to determine whether the app installed in the user terminal 10 is connected to any one system among the systems of the vehicle, such as Bluetooth and a car kit (S1362).

Thereafter, it is determined that the user terminal 10 is in the driving situation from the time when the app of the user terminal 10 is connected to the systems of the vehicle, and the preferred apps in the driving situation D can be extracted to the user terminal 10 based on the usage information of the frequently used apps in the driving situation D (S1363).

At this time, the preferred apps in the driving situation D can be extracted and displayed on the screen of the user terminal 10 together with the frequently used apps in the daily time period N. Particularly when the vehicle is in the driving situation, the frequently used apps in the driving situation D are continuously displayed on the screen of the user terminal 10, which makes it possible to minimize the time and effort otherwise spent searching for the frequently used apps in the driving situation D.

Thereafter, if the vehicle is stopped or parked, it is necessary to determine whether the frequently used apps in the driving situation D will be continuously extracted. In other words, it is necessary to determine whether the user terminal 10 is being used in the driving situation D. Therefore, after the vehicle is stopped or parked, it is determined whether the connection between the systems of the vehicle and the app of the user terminal 10 is disconnected (S1365).

Specifically, it is determined that the driving situation is terminated when a motion sensor included in the user terminal 10 senses that the user of the user terminal 10 is walking away from the vehicle, or when the connection signal between the user terminal 10 and the system of the vehicle weakens to a predetermined level or less (S1367).

At this time, it can be determined that the driving situation D has been terminated when the motion sensor included in the user terminal 10 senses that the user has walked at least 5 steps.

Alternatively, it can be determined that the driving situation D has been terminated when a distance greater than a minimum distance allowing a connection between the system of the vehicle and the app is sensed, or when the signal connected to the system of the vehicle weakens.

As mentioned above, about five frequently used apps can be extracted as the frequently used apps in the daily time period N. Alternatively, in the case of extracting the frequently used apps in the driving situation D, it need not be possible to extract five apps. This is because the number of frequently used apps in a special situation such as the driving situation D can be smaller than five.

In this case, as shown in FIGS. 10A and 10B, a smaller number of frequently used apps can be displayed in the driving situation D, compared to the number of frequently used apps in the daily time period N. In other words, the recommendation of unnecessary apps can be prevented by displaying only the frequently used apps in the special situation.

If the connection between the user terminal 10 and any one of the Bluetooth and the car kit of the vehicle is recognized in the pre-bedtime period B, it is determined that the user terminal 10 is in the driving situation D. Therefore, the frequently used apps in the driving situation D can be simultaneously extracted.

Further, when some of the frequently used apps in the driving situation D overlap with some of the frequently used apps in the daily time period N, it is possible to extract the frequently used apps in the driving situation D while excluding the overlapping apps.

Further, the frequently used apps in the driving situation D are displayed below the frequently used apps in the daily time period N, so that the frequently used apps in the daily time period N stand out.

When the number of the frequently used apps in the driving situation D is smaller than five, the case in which five apps need not be extracted was described as an example. In the same manner, it will be understood that when the number of frequently used apps in the pre-bedtime period B is smaller than five, five apps need not be extracted.

As described above, by extracting the frequently used apps in the specific time periods and the specific situations, the objectivity of extracting the frequently used apps can be improved, even if the time period and the situation change.

As described above, in order to express the frequently used apps, it is possible to collect the app usage information during at least one day and integrate the app usage information collected daily. Hereinafter, the method of expressing apps frequently used during one day based on the app usage information collected during one day, and the method of expressing the frequently used apps by integrating the app usage information collected daily, will be described below with reference to the drawings.

FIG. 11 illustrates an example of expressing the frequently used apps for one day in order to extract the frequently used apps, according to an embodiment of the present disclosure.

As shown in the drawing, the usage information of the apps used from 12 am to 12 pm on March 1 can be collected in order to determine the order of frequently used apps on March 1. If it is determined, based on the collected app usage information, that the most frequently used app is a messenger app, a highest proximity score (10 points) is given to the messenger app, and the total usage time and the number of times of execution (Frequency_3 times) of the app are extracted. By extracting such measurement values, a favorite score can be obtained. The favorite score can be obtained by multiplying a proximity (10) and a total usage time (19). In this manner, the frequently used apps can be listed based on the usage information of the frequently used apps for one day.

By integrating the app usage information recorded on a daily basis, the frequently used apps can be extracted.

Specifically, FIG. 12 illustrates an example of integrating app usage data for expressing frequently used apps according to an embodiment of the present disclosure. FIG. 13 shows an example of expressing the frequently used apps based on the integrated data shown in FIG. 12.

Referring to the drawings, the usage information of the apps used in the user terminal 10 can be collected in order to extract the frequently used apps. At this time, it is possible to collect the app usage information of the most recent four days before the current date on which the user terminal 10 is being used.

For example, on the assumption that the current date on which the user terminal 10 is being used is March 5, the app usage information from March 1 can be collected. At this time, if it is assumed that various apps, such as a messenger app and the like, were used frequently on March 1, the app usage frequency, the app usage time, and the like are extracted, and a favorite score can be given to the apps based on the extracted app usage information. As a result, the messenger app can be extracted as the app having the highest favorite score on March 1. In this manner, it is possible to sequentially extract the apps having the highest favorite score from March 2 to March 4 based on the usage information of the frequently used apps collected from March 2 to March 4.

By integrating the extracted app usage information of four days, a ranking of the app usage information of the four days before March 5 can be extracted. The messenger app, the settings app, the Internet browser app, the SNS app, and the music app can be extracted in that order. The integrated app usage information shows that the messenger app has the highest proximity. Therefore, the messenger app can be extracted as the most preferred and most frequently used app. Thereafter, the settings app, the Internet browser app, and the music app are extracted in descending order of favorite score. Accordingly, the settings app, the Internet browser app, and the music app can be extracted as second frequently used apps. Then, the SNS app was extracted as an app having a longest usage time among the remaining apps excluding the first and the second frequently used apps. Although the SNS app has a low favorite score, it has the longest usage time among the extracted apps (excluding the first and the second frequently used apps). Therefore, the SNS app can be extracted as one of the frequently used apps. The five apps extracted in the above-described manner can be displayed on the screen of the user terminal 10.

Similarly, the frequently used apps displayed on the user terminal 10 on March 6 can be extracted by collecting and integrating the usage information of the apps used from March 2 to March 5 in the same manner as that of extracting the frequently used apps on March 5.

As described above, in accordance with the method of expressing frequently used apps and the apparatus for expressing frequently used apps using the same according to the embodiment of the present disclosure, it is possible to collect and integrate the app usage information, learn the integrated app usage information using the artificial intelligence algorithm, and extract and recommend the frequently used apps. Accordingly, the frequently used apps can be extracted and recommended in response to changes in the usage information depending on date, time, and the like. In addition, since the frequently used apps are displayed on the user terminal in which the apps are executed, the user can easily execute the apps without having to search for the frequently used apps.

Further, the frequently used apps can be extracted and recommended according to different conditions depending on the time period and the situation. Accordingly, it is possible to prevent the frequently used apps used in a specific time period and a specific situation from being extracted according to biased conditions.

While specific embodiments of the present disclosure have been described and illustrated above, the present disclosure is not limited to the above-described embodiments and it will be understood by those skilled in the art that various changes and modifications can be made in other specific embodiments without departing from the spirit and scope of the present disclosure. Therefore, the scope of the present disclosure should be defined not by the above-described embodiments but by the technical idea defined in the following claims.

What is claimed is:

1. A method for displaying frequently used applications executed in a device, the method comprising:
   collecting, via at least one processor included in the device, application usage information for applications executed in the device during a daily time period covering one or more days, during a pre-bedtime period corresponding to a time of day during which a user prepares for bed, and during a driving situation;
   determining, via the at least one processor, an application usage pattern based on the application usage information;
   determining, via the at least one processor, a first set of frequently used applications corresponding to the daily time period, the determining the first set comprising:
   identifying a first type of application based on a usage frequency of the first type of application without consideration of an amount of application usage time of the first type of application,
   identifying at least one second type of application based on a usage frequency of the at least one second type of application and an amount of application usage time of the at least one second type of application, and
   identifying a third type of application based on an amount of application usage time of the third type of application without consideration of a usage frequency of the third type of application;
   determining, via the at least one processor, a second set of frequently used applications corresponding to the pre-bedtime period;
   detecting an occurrence of the driving situation;
   in response to detecting the occurrence of the driving situation, collecting execution information for a plurality of applications executed by the user after the occurrence of the driving situation;
   determining, via the at least one processor, a third set of frequently used applications corresponding to the driving situation; and
   displaying, via at least one display, first, second, and third application icons respectively corresponding to the first type of application, the at least one second type of application, and the third type of application together with an application icon corresponding to a frequently used application included in the second set or the third set, wherein the first set is displayed in a different screen region than the second or third sets.

2. The method of claim 1, wherein the second application icon corresponding to the at least one second type of application is displayed between the first application icon corresponding to the first type of application and the third application icon corresponding to the third type of application.

3. The method of claim 1, wherein the identifying the third type of application is only based on the amount of application usage time of the third type of application.

4. The method of claim 1, wherein the determining the second set of frequently used applications corresponding to the pre-bedtime period comprises:
identifying a fourth type of application based on a usage frequency of the fourth type of application during the pre-bedtime period without consideration of an amount of application usage time of the fourth type of application,
identifying at least one fifth type of application based on a usage frequency of the at least one fifth type of application during the pre-bedtime period and an amount of application usage time of the at least one fifth type of application during the pre-bedtime period, and
identifying a sixth type of application based on an amount of application usage time of the sixth type of application during the pre-bedtime period without consideration of a usage frequency of the sixth type of application.

5. The method of claim 1, further comprising:
determining a first time when a specific application was last used in the device;
determining a second time when the specific application is executed again in the device after the determining the first time when the specific application was last used in the device; and
in response to at least four hours elapsing between the first time and the second time, determining a time period from the first time when the application was last used until a predetermined time as the pre-bedtime period.

6. The method of claim 1, further comprising:
in response to a subsequent occurrence of the driving situation, displaying the third set of frequently used applications,
wherein the third set includes one or more application icons corresponding to one or more of the plurality of applications executed by the user after the occurrence of the driving situation.

7. The method of claim 1, further comprising:
in response to a subsequent occurrence of the driving situation, displaying the third set of frequently used applications,
wherein the third set includes at least two application icons corresponding to two of the plurality of applications executed by the user after the occurrence of the driving situation, and the at least two application icons in the third set are displayed based on an execution order performed by the user during the driving situation.

8. The method of claim 1, further comprising:
determining that the device is connected to a system of a vehicle; and
in response to determining that the device is connected to the system of the vehicle, determining that the device is being used in the driving situation and displaying the third set of frequently used applications.

9. The method of claim 1, further comprising:
after determining that the device is being used in the driving situation, determining that the driving situation has terminated based on a motion sensor in the device detecting a walking motion of the user or a connection signal between the device and a system of a vehicle being equal to or less than a predetermined level; and
in response to determining that the driving situation has terminated, stop displaying the third set of frequently used applications.

10. A device for displaying frequently used applications, the device comprising:
a display configured to display an image;
a memory configured to store application usage information; and
at least one processor configured to:
collect application the usage information for applications executed in the device during a daily time period covering one or more days, during a pre-bedtime period corresponding to a time of day during which a user prepares for bed, and during a driving situation,
determine an application usage pattern based on the application usage information,
identify a first type of application based on a usage frequency of the first type of application without consideration of an amount of application usage time of the first type of application,
identify at least one second type of application based on a usage frequency of the at least one second type of application and an amount of application usage time of the at least one second type of application,
identify a third type of application based on an amount of application usage time of the third type of application without consideration of a usage frequency of the third type of application,
determine a first set of frequently used applications corresponding to the daily time period, the first set including the first type of application, the at least one second type of application, and third type of application,
determine a second set of frequently used applications corresponding to the pre-bedtime period,
detect an occurrence of the driving situation,
in response to detecting the occurrence of the driving situation, collect execution information for a plurality of applications executed by the user after the occurrence of the driving situation,
determine a third set of frequently used applications corresponding to the driving situation, and
display, via the display, first, second, and third application icons respectively corresponding to the first type of application, the at least one second type of application, and the third type of application together with an application icon corresponding to a frequently used application included in the second set or the third set, wherein the first set is displayed in a different screen region than the second or third sets.

11. The device of claim 10, wherein the at least one processor is further configured to:
display, via the display, the second application icon corresponding to the at least one second type of application between the first application icon corresponding to the first type of application and the third application icon corresponding to the third type of application.

12. The device of claim 10, wherein the third type of application is identified only based on the amount of application usage time of the third type of application.

13. The device of claim 10, wherein the at least one processor is further configured to:
- identify a fourth type of application based on a usage frequency of the fourth type of application during the pre-bedtime period without consideration of an amount of application usage time of the fourth type of application,
- identify at least one fifth type of application based on a usage frequency of the at least one fifth type of application during the pre-bedtime period and an amount of application usage time of the at least one fifth type of application during the pre-bedtime period,
- identify a sixth type of application based on an amount of application usage time of the sixth type of application during the pre-bedtime period without consideration of a usage frequency of the sixth type of application, and
- determine that the second set of frequently used applications corresponding to the pre-bedtime period includes the fourth type of application, the at least one fifth type of application and the sixth type of application.

14. The device of claim 10, wherein the at least one processor is further configured to:
- determine a first time when a specific application was last used in the device,
- determine a second time when the specific application is executed again in the device after determining the first time when the specific application was last used in the device, and
- in response to at least four hours elapsing between the first time and the second time, determine a time period from the first time when the application was last used until a predetermined time as the pre-bedtime period.

15. The device of claim 10, wherein the at least one processor is further configured to:
- in response to a subsequent occurrence of the driving situation, display the third set of frequently used applications,
- wherein the third set includes one or more application icons corresponding to one or more of the plurality of applications executed by the user after the occurrence of the driving situation.

16. The device of claim 10, wherein the at least one processor is further configured to:
- in response to a subsequent occurrence of the driving situation, display the third set of frequently used applications,
- wherein the third set includes at least two application icons corresponding to two of the plurality of applications executed by the user after the occurrence of the driving situation, and the at least two application icons in the third set are displayed based on an execution order performed by the user during the driving situation.

17. The device of claim 10, wherein the at least one processor is further configured to:
- determine that the device is connected to a system of a vehicle, and
- in response to determining that the device is connected to the system of the vehicle, determine that the device is being used in the driving situation and display the third set of frequently used applications.

18. The device of claim 10, wherein the at least one processor is further configured to:
- after determining that the device is being used in the driving situation, determine that the driving situation has terminated based on a motion sensor in the device detecting a walking motion of the user or a connection signal between the device and a system of a vehicle being equal to or less than a predetermined level, and
- in response to determining that the driving situation has terminated, stop displaying of the third set of frequently used applications.

19. A method for displaying frequently used applications executed in a device, the method comprising:
- collecting, via at least one processor included in the device, application usage information for applications executed in the device during a daily time period covering one or more days, during a pre-bedtime period corresponding to a time of day during which a user prepares for bed, and during a driving situation;
- determining, via the at least one processor, an application usage pattern based on the application usage information;
- determining, via the at least one processor, a first set of frequently used applications corresponding to the daily time period, the determining the first set comprising:
  - identifying a first type of application based on a usage frequency of the first type of application without consideration of an amount of application usage time of the first type of application,
  - identifying at least one second type of application based on a usage frequency of the at least one second type of application and an amount of application usage time of the at least one second type of application, and
  - identifying a third type of application based on an amount of application usage time of the third type of application without consideration of a usage frequency of the third type of application;
- determining, via the at least one processor, a second set of frequently used applications corresponding to the pre-bedtime period;
- determining that the device is connected to a system of a vehicle; and
- in response to determining that the device is connected to the system of the vehicle, determining that the device is being used in the driving situation and displaying the third set of frequently used applications;
- determining, via the at least one processor, a third set of frequently used applications corresponding to the driving situation; and
- displaying, via at least one display, first, second, and third application icons respectively corresponding to the first type of application, the at least one second type of application, and the third type of application together with an application icon corresponding to a frequently used application included in the second set or the third set,
- wherein the first set is displayed in a different screen region than the second or third sets.

* * * * *